Figure 1:
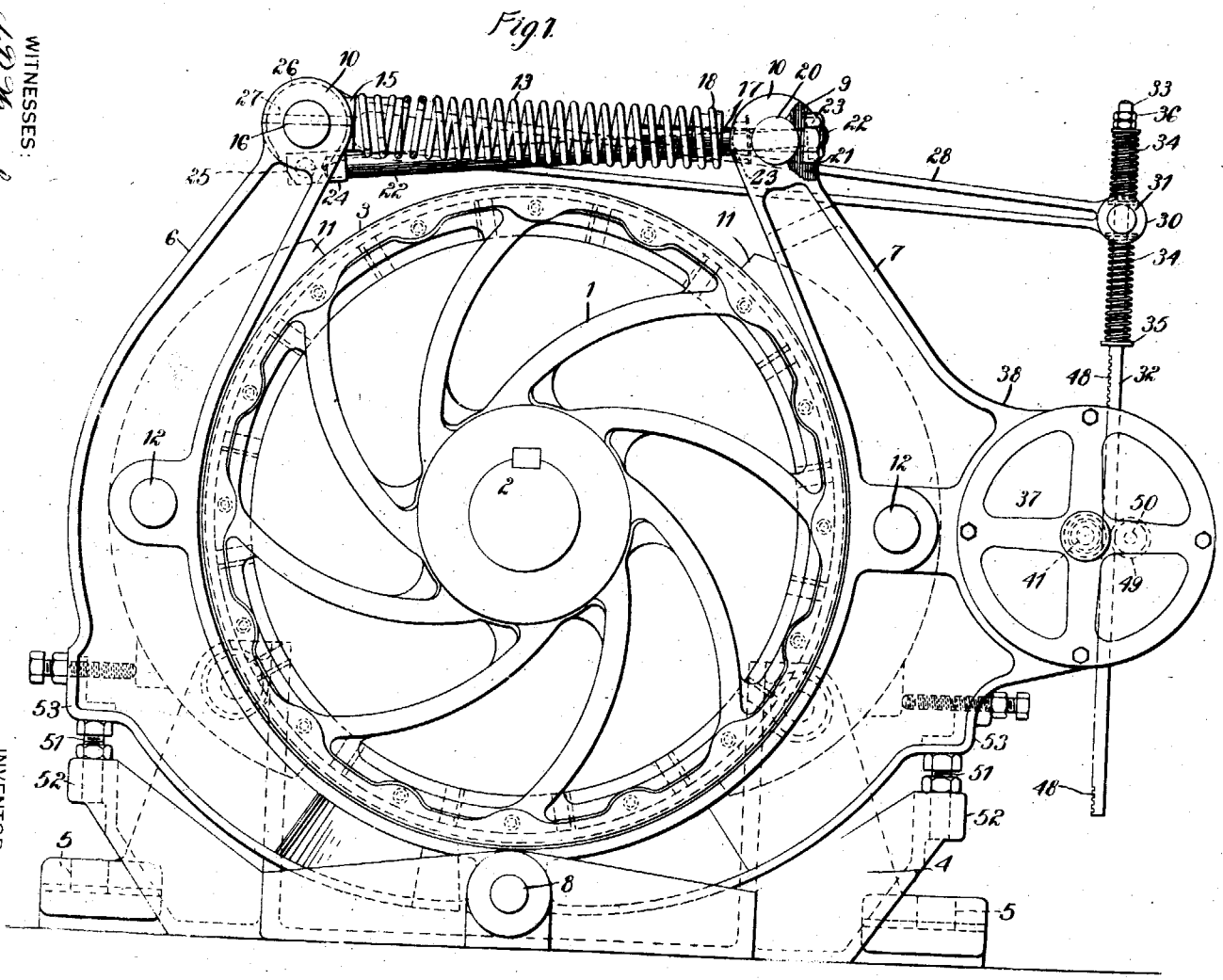

C. B. MILLS AND J. P. NIKONOW.

WHEEL BRAKE.

APPLICATION FILED JULY 22, 1918.

Reissued Jan. 27, 1920.

14,797.

2 SHEETS—SHEET 1.

WITNESSES:

J. P. Wurmb

R. J. Fitzgerald

INVENTOR

Chester B. Mills &

John P. Nikonow.

BY

Wesley G. Carr

ATTORNEY

C. B. MILLS AND J. P. NIKONOW.

WHEEL BRAKE.

APPLICATION FILED JULY 22, 1918.

Reissued Jan. 27, 1920.

14,797.

2 SHEETS—SHEET 2.

WITNESSES:

J. R. Mumb.

R. J. Fitzgerald

INVENTOR

Chester B. Mills &

John P. Nikonow.

BY

Wesley G. Saar

ATTORNEY

UNITED STATES PATENT OFFICE.

CHESTER B. MILLS, OF EAST McKEESPORT, PENNSYLVANIA, AND JOHN P. NIKONOW, OF NEW YORK, N. Y., ASSIGNORS TO WESTINGHOUSE ELECTRIC AND MANUFACTURING COMPANY, A CORPORATION OF PENNSYLVANIA.

WHEEL-BRAKE.

14,797. Specification of Reissued Letters Patent. Reissued Jan. 27, 1920.

Original No. 1,204,471, dated November 14, 1916, Serial No. 752,635, filed March 7, 1913. Application for reissue filed July 22, 1918. Serial No. 246,253.

*To all whom it may concern:*

Be it known that we, CHESTER B. MILLS, a citizen of the United States, and a resident of East McKeesport, in the county of Allegheny and State of Pennsylvania, and John P. Nikonow, a citizen of Russia, and a resident of New York, in the county of New York and State of New York, have invented a new and useful Improvement in Wheel-Brakes, of which the following is a specification.

Our invention relates to wheel brakes such as are commonly used in connection with elevators, hoists, and rolling mills.

Our invention has for its object to provide an operating mechanism for brakes of the character above indicated which is simple and efficient in operation and which reduces the power required to operate such brakes.

In the operation of machinery which is motor driven, it is necessary, for purposes of control and safety, to use brakes which are automatic in operation and effective when applied. For example, in rolling mills and blooming mills, where frequent stops and reversals are necessary, brakes are essential for saving time in bringing the motors to rest before reversing and in assisting in accuracy of control. In the operation of elevators and hoists, brakes not only enable the attendant to stop the mechanism at any desired point, but automatically hold the load in case of failure of current supply from any cause whatever.

It has been the practice, heretofore, to release the brake by means of an electromagnet having sufficient power to overcome the tension of heavy springs which hold the brake shoes against a wheel when the magnet is not energized. The magnet must be large to furnish the power required and, on this account, it constitutes a material item of the cost of manufacture of the brake mechanism. It is not practicable to use a smaller magnet with a power-reduction mechanism because of the greater range of movement required on the part of the magnet armature and the resultant increase of the air gap to such length that the magnet would be ineffective.

Magnet-operated brakes, furthermore, are attended with considerable noise due to the destructive hammering of the armature when coming into engagement with the electromagnet, and to the brake shoes coming into sudden engagement, with excessive strains, against the brake wheel and against stops designed to limit their movement. The noise due to the first-mentioned source is particularly objectionable in connection with magnet brakes operated by alternating current.

In our invention, we employ a small electric motor which is connected to the brake shoes by suitable gearing mechanism and levers. A plurality of buffer springs serve to cushion the force operating the brake shoes, absorbing the energy stored in the lever 28, hereinafter referred to, during both the forward and reverse movement. The motor operates to release the shoes from engagement with the brake wheel in opposition to the force of springs which normally maintain said engagement. When power is cut off from the motor, these springs, tending to return the brake shoes into engagement with the wheel, cause the motor to reverse. This would have a tendency to bring the motor to a sudden stop at the instant when the shoes come into engagement with the wheel, followed by a reversal of the operating forces, continuing in a vibratory engagement and disengagement of the shoes and the wheel, or a hunting effect, which would considerably lengthen the cycle of operation. We avoid these difficulties by providing a one-way, slip-clutch connection between the motor and the operating mechanism. The resulting shocks and strains due to the sudden application of the motor torque, and the sudden release of the same, are in part prevented also by the buffer springs.

Figures 2, 3, 4:
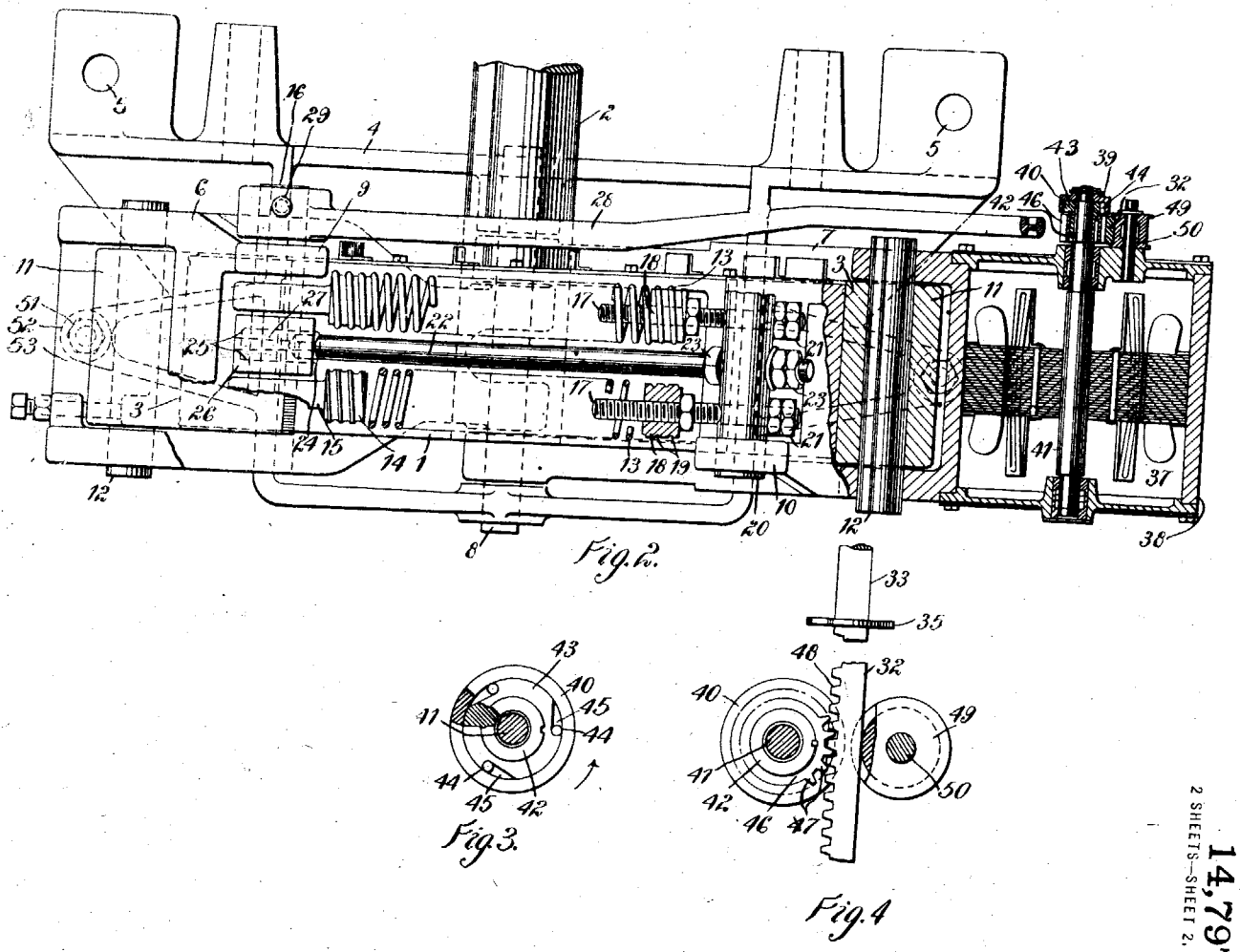

Figure 1 is an end view in elevation of the brake mechanism and a wheel to which it is applied, Fig. 2 is a view, partially in plan and partially in section, and Figs. 3 and 4 are enlarged views of details, partly in section.

The brake wheel 1 is mounted on the shaft 2 of an electric motor, not shown, and has a suitable periphery 3 adapted for frictional engagement with co-operating shoes. The base 4 of the brake, which may be of cast iron or other suitable material, is mounted upon any suitable supporting structure and is provided with holes 5 for fastening bolts. Two curved levers 6 and 7 are pivotally supported by a pin 8 at the center of the base 4 and extend upwardly at the sides of the wheel 1, each ending in a bifurcated portion having spaced lugs 9 and 10.

Each lever has a concave inner surface which forms a recess or housing in which a brake shoe 11 is pivotally mounted upon a support 12, the pivots being substantially diametrically opposite relative to the wheel 1. The levers 6 and 7 are normally drawn toward each other by tension springs 13, end coils of which engage grooves 14 of eye-bars 15 having a pivotal support on a rock shaft 16 mounted in the lugs 9 and 10 of the lever 6. Each of the springs 13 is attached to the lever 7 by a bolt 17 having an adjustable nut 18 provided with grooves 19 which engage the end turns of the spring.

The bolts 17 project through suitable openings in a rod 20 which is rotatably supported in the lugs 9 and 10 of the lever 7, the outer ends of the bolts being provided with nuts 21. A rod 22 projects through a suitable opening in the rod 20 and is retained by nuts 23, its other end being screwed into a lug 24 that has a pivotal support between the bifurcations 25 of a collar 26, which is mounted upon the rock shaft 16 and is fastened thereto by a pin 27. One end of a lever 28 is attached, by means of a set screw 29 or other suitable device, to one end of the shaft 16. The opposite end of the lever 28 is provided with bifurcations 30 which rotatably support a rod 31. A rack 32 has an extended portion 33 that projects through a suitable opening in the rod 31 and is held in position by two buffer springs 34 which are retained by an abutment 35 and a nut 36, respectively. The purpose of the springs 34 is to do away with the hammer blow which would otherwise obtain both when the brake levers are brought into engagement with the stops 51, as explained below, and when the brake shoes are returned into engagement with the wheel by the force of the springs 13. The cushioning effect of the buffer springs 34 is transmitted to the various parts through the long lever 28, preventing undue shocks and strains on the machinery, and considerably reducing the noise incident to the operation of magnet brakes.

An electric motor 37, which is preferably of the squirrel cage induction type, is mounted upon the lever 7 and has its frame 38 integral therewith. A collar 39 having a cylindrical flange 40, is rigidly mounted on the armature shaft 41. A sleeve 42 is loosely mounted on the shaft 41 and has a flange 43 between which and the flange 40 is a roller clutch of the usual construction having rollers 44 in grooves 45 in the flange 43. A pinion 46 having teeth 47 which mesh with teeth 48 on the rack 32, is keyed to the sleeve 42 adjacent the flange 43. A guide wheel 49 is rotatably mounted on a pin or stud 50 fixed on the motor frame 38 and holds the rack 32 in engagement with the pinion 46.

Normally, the springs 13 draw the levers 6 and 7 toward each other with the shoes 11 engaging the wheel 1, as shown in Fig. 1. When current is supplied to the motor through any suitable electrical connections, the motor shaft is rotated counter-clockwise, as shown by the arrows in Figs. 1 and 3. The flange 40 engages the rollers 44 and rotates the sleeve 42 and the pinion 46 to actuate the rack 32 upwardly and the rack, in turn, actuates the lever 28 to rock the shaft 16 and the collar 26 in a counter-clockwise direction. The collar 26 and the rod 22 now act as a toggle to separate the levers 6 and 7. This movement is limited by adjustable stops 51 that are mounted on projections 52 on the base 4 and engage shoulders 53 on the levers 6 and 7. The motor stops when the levers engage the stops 51, but its torque is constant while its circuit remains closed. When the circuit of the motor is broken, no torque is exerted and the tension of the springs 13 is then unopposed. The levers 6 and 7 are drawn toward each other, and the rod 22 and the collar 26 rotate the rod 16 in a clockwise direction for actuating the lever 28 to carry the rack downwardly. The motor is rotated backwardly by the pinion 46 and the roller clutch, and continues to rotate freely after the shoes 11 have engaged the wheel 1 by reason of the one-way clutch connection, thereby avoiding the causing of undue strains upon the parts, and the reversal of the operating forces, or the hunting effect above referred to, by suddenly stopping the motor. The kinetic energy stored in the motor armature during its reversal is thereby dissipated, and the motor is further brought comparatively quickly to a smooth stop by the frictional engagement of the various parts.

The brake is arranged to release the wheel 1 when the current is applied to the main motor and to hold the wheel when the main circuit is broken. This arrangement is made automatic by adapting the brake motor circuit to be closed and opened simultaneously with that of the main motor, or by connecting the brake motor in shunt with the main motor.

An important advantage of our improvement over the devices now used, is that, while the stops 51 may be adjusted to compensate for the wear of the brake shoes, it need be done only at long intervals, as the rack allows the range of movement to be shifted along its length without any manual adjustment. In the magnet brake, the wear of the brake shoes causes the length of the air gap of the magnet to vary, and frequent manual adjustment is thereby made necessary.

Another advantage of our invention is that the motor is integral with the brake lever, which arrangement permits the entire structure to be assembled as a unit, thus avoiding the inconvenience involved in mounting the motor separate from the brake and adjusting the connections between the two devices. The total power used by the motor is much less than that of a magnet because the latter has a variable air gap, while that of the motor is small and constant.

Although we have illustrated and described one embodiment of our invention, it will be understood that our invention is not confined thereto, or to the structural details herein shown and described.

We claim as our invention:

1. In combination, a wheel, brake shoes adapted for frictional engagement with said wheel, a motor having supporting means in common with one of said brake shoes, and means for operatively connecting said motor to said brake shoes, said means comprising a rack and pinion and a plurality of levers.

2. In a wheel brake, a plurality of brake shoes, a wheel adapted for frictional engagement by said brake shoes, pivotally mounted levers for supporting said brake shoes, an electric motor, a pinion on the shaft of said motor, a slip clutch for connecting the pinion to the motor shaft, and a rack operatively connecting said pinion to said levers.

3. In combination, a brake wheel, a lever adjacent said wheel having means for engaging said wheel, and a motor on said lever having a rotatable element yieldingly operatively connected thereto.

4. In combination, a brake wheel, a lever adjacent said wheel having means for engaging said wheel, a motor carried by said lever and having a frame integral with said lever, and means comprising a rack and pinion mechanism for operatively connecting said motor to said lever.

5. In combination, a brake wheel, levers on opposite sides of said wheel, brake shoes on said levers, and a motor mounted on one of said levers and having a rotatable element yieldingly operatively connected to both of said levers.

6. In combination, a brake wheel, levers on opposite sides of said wheel, means for yieldingly drawing said levers toward said wheel, a motor on one of said levers, and a spring and gear mechanism for yieldingly operatively connecting said motor to said levers.

7. In a wheel brake, the combination with a wheel, of a pair of brake shoes for frictionally engaging said wheel, a pair of pivotally mounted levers for supporting said brake shoes, an electric motor carried by one of said levers and having its frame integral therewith, and means for operatively connecting said motor to said levers, said means comprising a pinion, a one-way clutch and a rack.

8. In combination, a wheel, a brake shoe biased to frictional engagement therewith, a motor and an over-running, one-way clutch for connecting said motor to said shoe.

9. In combination, a braking device, a reversible motor operable in one direction only to effect the operation of said device, and a slip clutch connection between said device and said motor.

10. In combination, a brake wheel, a brake shoe, means for biasing said shoe to engagement with said wheel, a motor adapted to be operated in one direction to release said engagement and adapted to be driven by said biasing means in the opposite direction and means permitting continued predetermined rotation of said motor after said engagement has been reëstablished.

11. In combination, a braking device biased in one direction, a motor for operating the same in the opposite direction and adapted to be driven thereby in said one direction and means for dissipating the inertia energy stored in the rotor of said motor.

12. In combination, a braking device biased in one direction and a motor for operating the same in the opposite direction and adapted to be driven thereby in the one direction and to be thereupon frictionally brought to a stop.

13. In combination, a wheel, means for operating the same, brake shoes adapted for frictional engagement with said wheel, a motor and means for causing said motor to actuate said shoes without shock.

14. The combination with a motive mechanism and a braking device therefor, of means for biasing said device in one direction, a motor for operating the same in the opposite direction, and means for cushioning the action of said motor.

15. In combination, a wheel, brake shoes adapted to engage said wheel, a spring for forcing said shoes into engagement with said wheel, a motor for releasing said engagement and means including a spring for overcoming the force of said first spring.

16. The combination with a wheel, of a plurality of pivotally mounted brake shoes for frictionally engaging said wheel, an electric motor, linkage mechanism for connecting said motor to said brake shoes, and a slip-clutch connection between said mechanism and said motor.

17. In a wheel brake, the combination with a wheel, and a plurality of brake shoes for engaging said wheel, of an electric motor, a clutch element loosely mounted on the shaft of said motor, means connecting said clutch element to said shoes, and means for causing said shaft to engage said clutch element when said motor is operated to release said brake and for causing said clutch element to engage said shaft to rotate said motor during the resetting of said brake.

18. In combination, a brake wheel, a brake shoe adapted to engage said wheel, a stop for said shoe, a motor for actuating said brake shoe into engagement with said stop, and means for cushioning the force of said engagement.

19. In a wheel brake, the combination with a wheel, a pair of levers pivotally mounted on opposite sides of said wheel, brake shoes carried by said levers, and means for biasing said shoes into engagement with said wheel, of toggle links pivoted to said levers, an arm secured to one of said links, an electric motor, means for operatively connecting said arm to said motor, and means for cushioning the operative force of said motor.

20. In combination, a wheel, brake shoes adapted to engage said wheel, means for forcing said shoes into engagement with said wheel, means for releasing said engagement, and means for dissipating the energy stored by the action of both said two first means.

21. In combination, a brake wheel, a lever adjacent to said wheel and having means for engaging said wheel, and a motor having a rotatable element yieldingly operatively connected to said lever.

22. In combination, a braking device biased in one direction, a motor for operating the same in the opposite direction and adapted to be driven thereby in said one direction, and means comprising a spring for stopping said motor.

23. In combination, a wheel, levers pivotally mounted on opposite sides of said wheel and provided with brake shoes, an electric motor, a pinion on the shaft of said motor, a rack meshing with said pinion and linked to said levers, and a spring controlled by said rack for stopping said motor.

24. In combination, a braking device, a stop therefor, a motor for actuating said device into engagement with said stop, and means for cushioning the force of said engagement.

25. In combination, a brake wheel, motive means therefor, a brake shoe adapted for engagement therewith, a motor for actuating said shoe, and means for cushioning the force of said engagement.

26. In combination, a braking device, a motor for operating the same, means for mechanically connecting said motor to said device, and yielding means controlled by said connecting means for controlling the operation of said motor.

27. In combination, a braking device, a motor for operating the same in one direction and adapted to be driven thereby in the other direction, and a pair of springs for controlling the operation of said motor in said two directions.

28. In combination, a brake biased for setting thereof, a torque motor to release said brake and to be driven thereby upon resetting thereof, and means supplementing the resistive force of said brake to stall said motor upon release of said brake.

29. The combination with a brake shoe, and an electric motor, of means for operatively connecting said motor to said shoe, said means comprising a device operable to permit the backward rotation of said motor, upon the opening of its circuit, without actuating said brake shoe.

30. The combination with a wheel, of a plurality of pivotally mounted brake shoes for frictionally engaging said wheel, an electric motor, linkage mechanism for connecting said motor to said brake shoes, and means for permitting the motor to rotate backwardly without actuating said mechanism.

31. The combination with a wheel, a brake shoe for coacting with said wheel, a motor and means comprising a one-way clutch for operatively connecting said motor to said shoe, whereby said motor is permitted to rotate backwardly by reason of its inertia without actuating said shoe.

In testimony whereof we have hereunto subscribed our names this 6th day of July, 1918.

CHESTER B. MILLS.
JOHN P. NIKONOW.